United States Patent [19]

Gutsche

[11] Patent Number: 4,525,111

[45] Date of Patent: Jun. 25, 1985

[54] SLIDE-ON ROTARY TOOLS

[76] Inventor: Gunter E. Gutsche, 4476 Forget, St Louis de Terrebonne, Quebec, Canada, J0N 1N0

[21] Appl. No.: 424,422

[22] Filed: Sep. 27, 1982

[51] Int. Cl.3 .............................................. B23B 45/00

[52] U.S. Cl. .................................... 408/239 A; 7/158; 279/43; 408/226

[58] Field of Search ............. 279/1 A, 1 R, 43, 46 R, 279/47, 50, 57, 1 B, 1 F, 9 R, 41 R, 45; 408/239 A, 202, 226; 7/158, 138; 81/177 A, 177 G

[56] References Cited

U.S. PATENT DOCUMENTS

| | | | |
|---|---|---|---|
| 481,259 | 8/1892 | Feicker | 279/43 X |
| 943,616 | 12/1909 | Holub | 279/46 |
| 1,265,113 | 5/1918 | Reimer et al. | 279/43 |
| 1,320,181 | 10/1919 | Smith | 279/43 |
| 1,658,504 | 2/1928 | Weiss | 279/43 |
| 3,023,015 | 2/1962 | Pankow | 279/1 A |
| 3,336,611 | 8/1967 | Schepp | 7/14.1 |
| 3,467,400 | 9/1969 | MacKenzie et al. | 279/1 R |
| 3,521,896 | 7/1970 | Matsumoto | 279/1 B |
| 3,924,334 | 12/1975 | Lentine et al. | 279/43 X |
| 3,932,904 | 1/1976 | Nilson | 7/14.1 |
| 3,973,784 | 8/1976 | Smith | 279/1 A |
| 4,052,788 | 10/1977 | Hastings et al. | 279/43 X |
| 4,218,794 | 8/1980 | Seidel | 7/138 |
| 4,218,795 | 8/1980 | Ernst et al. | 7/158 |

FOREIGN PATENT DOCUMENTS

| | | | |
|---|---|---|---|
| 680403 | 4/1930 | France | 279/43 |
| 2255814 | 7/1975 | France . | |

*Primary Examiner*—William R. Briggs
*Assistant Examiner*—Glenn L. Webb

[57] ABSTRACT

The present invention relates to rotary tool bits driven by electric tools where torque forces are transmitted to the rotary tool bits by way of adapting means through the shank portions of other tool bits already in the electric tools. These adapting means comprise elongated members closely, axially aligned disposed about these rotary tool bits and have inside surfaces adapted to fit said shank portions. The elongated members are pressed against said shank portions by compressing means which might be sliding sleeves. The adapting means might comprise two, three or six such elongated members. Low friction sliding sleeves with interior rolling members for such rotary bits are also provided.

4 Claims, 3 Drawing Figures

SLIDE-ON ROTARY TOOLS

BACKGROUND OF THE INVENTION

1. Field of the Invention

The present invention relates to tool bits for use on electric tools.

Accordingly the present invention relates more particularly to rotary tools that are adapted to receive their rotational forces from the shank portions of tool bits used on electric tools without chucks.

2. Cross References and Related Applications

The applicant of the present invention has filed on Dec. 18, 1980 an application of an invention entitled: "Elements for a Tool System" carrying Ser. No. 217,798 now U.S. Pat. No. 4,413,937 and on Aug. 23, 1982 an application for an invention entitled "Screw Drill Adjustable for Various Sizes" and is filing on the filing date of this invention another application for a "Method and Apparatus for Securing Combination Tools". All these applications although differing in function and structure from the present invention deal with tools used in electric- and hand tools.

3. Description of the Prior Art

In the use of electric hand tools such as drills, the operation in one location often entails multiple operations such as drilling, counterboring a pilot hole and finally driving a fastener into the hole. It is very efficient workpractice to do these operations with a single machine, and the present invention provides accordingly slide-on tools to be secured temporarily onto the shank portion of the tool bit used already in the machine. The invention of the applicant with Ser. No. 217,798 now U.S. Pat. No. 4,413,937 and known by the Trademark CHUCK-MATE enables the operator of such an electric drill to insert a three-pronged rotary tool over the tool bit which might have a round shank into the chuck of the machine. In this system, rotational forces are transmitted to the rotary tool by way of the sides of the pronges from the sides of the jaws of the said chuck. However, many craftsmen use in addition to a chuck-equipped drill an electric screw-driver which has ratchet means and depth-stopping means but in most cases has no chuck. Another means to drive a tool bit from another was taught by Smith in U.S. Pat. No. 3,973,784 where a hexagonal cavity is used to pick up the rotation that via a hand-held free-wheeling handle is guided and transmitted to the rotary tool. The present invention differs in function and structure from the Smith device in these important aspects: The present invention becomes temporarily attached to the machine used and requires no guidance by the free hand of the operator, and needs therefore no guiding sleeve. The means to take off torque from the shank portion of the tool bit in the machine is not a fixed-dimension cavity but is made of many members, self-adjusting and has compression means. It offers therefore significant improvement over the Smith device.

SUMMARY OF THE INVENTION

It is therefore the object of the present invention to provide a slip-on rotary tool that can be temporarily fastened to the shank portion of a tool bit in an electric screwdriver.

Another object of the invention is to provide a drill bit that is adapted to be rotated by the shank portion of another tool bit held in an electric screw driver where said adapted drill bit can be withdrawn from the work piece by use of the electric screw driver.

Another object of the present invention is to provide a rotary tool for use with an electric hand tool where rotation is transferred via a tool bit held in the hand tool, and where the adapting means for the transfer of the rotation is self-adjusting.

The objects of the present invention are accomplished in the following embodiments:

In one embodiment the adapting means for aligning the rotary tool of the present invention with the driving shank portion comprises two elongated members having each three inside surface portions that are adapted to enclose nearly $\frac{1}{2}$ of said shank portion, and a sliding washer is the compressing means to press the two members onto the shank portion.

In another embodiment the adapting means of the present invention comprise three elongated members with an inside surface having two portions set at 120° to each other and where a sliding ring applies concentric pressure to these members and thus fastens them temporarily to the shank portion of the driving tool bit.

In a further embodiment the adapting means of a rotary tool according to the present invention comprises six members with substantially flat inside surfaces. These inwardly facing surfaces are adapted to align with the six sides of a hexagonal shank portion of a further tool bit. The compressing means for these six members are balls aligned in a cage-like ring where they can move axially inside a tapering sleeve. Optionally all embodiments could be equipped with this low-friction compression means. Also protrusions are provided on the adapting means to retain the compressing means on the elongated members.

BRIEF DESCRIPTION OF THE DRAWINGS

The invention is illustrated by way of example in the following drawings wherein.

DESCRIPTION OF THE PREFERRED EMBODIMENTS

Referring now in detail to the drawings.

Figure 1:
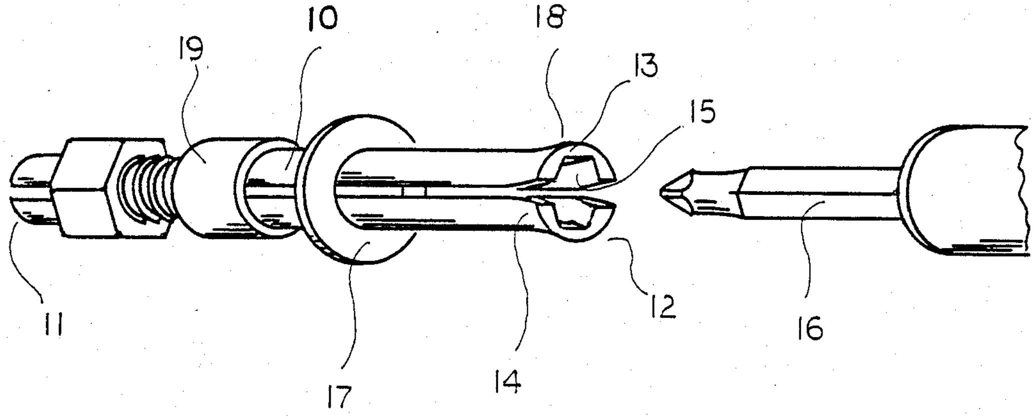
FIG. 1 is a perspective side view of a rotary tool of the present invention in alignment to a driving tool bit in a partially shown electric screw driver.

In FIG. 1 is shown adapting tool 10 with distal end 11 having a collet chuck and proximal end 12 with the adapting means which comprise members 13 and 14 each having three inside surface portions 15 which are adapted to fit hexagonal shank portion 16 of a tool bit in a partially shown electric screw driver. Ring 17 is the compressing means and should be of a material with a low coefficient of friction such as brass and is so dimensioned that it exerts increasing concentric pressure on members 13 and 14 as it is axially slid toward proximal end 12. Also for this purpose members 13 and 14 could increase on transversal dimension toward proximal end 12 as they do at protrusions 18 that are provided to prevent ring 17 from sliding off members 13 and 14. Sleeve 19 performs the same function toward distal end 11 and serves also as handling point for tool 10 and covers the junction between members 13 and 14 and the distal portion 11. This junction could be spot welds.

Alternately members 13 and 14 could be made from a hexagonal tube by a central longitudinal cut. Protrusions 18 could be forged on members 13 and 14 and bend outwardly providing a bevel for easier insertion of shank portion 16. Members 13 and 14 could be of a low-carbon steel and case-hardened and also nickel-plated to facilitate sliding of compressing ring 17.

In operation a selected tool would be held at the proximal end 11 by the collet chuck and with ring 17 near the sleeve 19, adapting tool 10 would be slid onto shank portion 16. Ring 17 would then be slid toward proximal end 12, which action will tightly press inside surface portions 15 against hexagonal shank portion 16. When power turns shank portion 16, rotational forces are transferred from the shank portion 16 to the inside surface portions 15, allowing work to be done by the tool at the distal end 11. Upon completion of this work and withdrawal of the tool 10 from the work piece, the ring 17 is moved toward the distal end 11 until the ring 17 abuts against the sleeve 19, which motion when continued then slides tool 10 off shank portion 16, freeing it to proceed with work done with the tool having shank portion 16.

Figure 2:
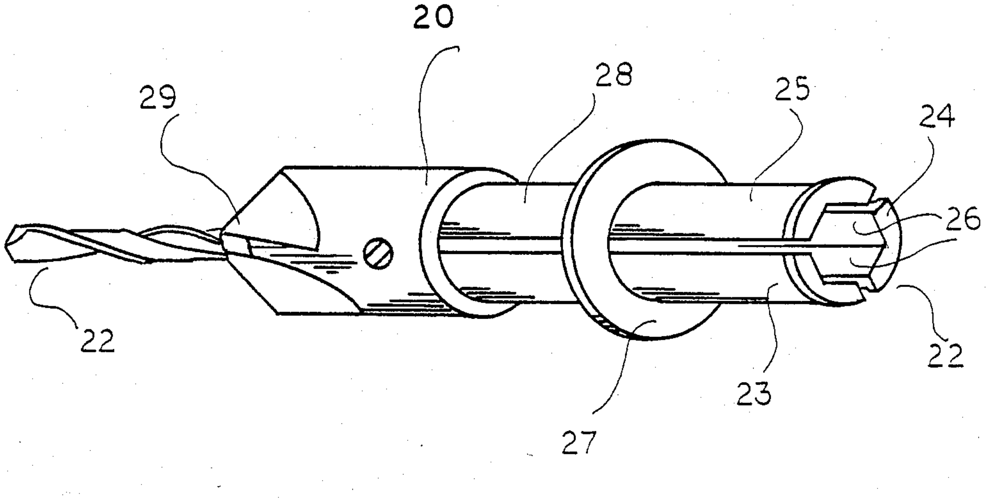
FIG. 2 is a perspective side view of a screw drill of the present invention and FIG. 3 is a perspective side view of a tool holder of the present invention showing hidden elements in phantom lines.

In FIG. 2 is seen screw drill 20 with distal end 21 and proximal end 22 which has adapting means comprised of longitudinal members 23, 24 and 25. These members have two inside surface portions 26 each, that are forming an angle of 120° so as to adapt in combination with the hexagonal shank of another tool bit. Compressing washer 27 is adapted to slide axially on outer surfaces 28 of members 23, 24 and 25. Cutting tool 29 at distal end 21 serves to make countersunk screw holes.

In operation screw-drill 20 would be slid onto the shank of a screw driver bit held already in an electric screw driver, and then tightly fastened there by moving washer 27 toward proximal end 22 whereby the inside surface portions 26 on the said shank can then transmit torque forces, but also permit manipulation of the electric screw driver without having to separately handle drill 20 with the free hand. Many electric screw drivers stop rotating once pressure is eased off the tool. This would leave cutting tool 29 to stick with the workpiece 47 in the hole 46, unlike with electric drills, where rotation normally is not stopped until the drill bit is well clear of the hole. The tight grip obtained by the application of the compression means of the ring 27 and the members 23,24 and 25 allows the cutting tool 29 to be withdrawn by pull on the electric screw driver alone. Members 23, 24 and 25 could be extrusions or formed wires surface-hardened and preferably polished on outer surface 28 to ease the sliding of ring 27.

Figure 3:
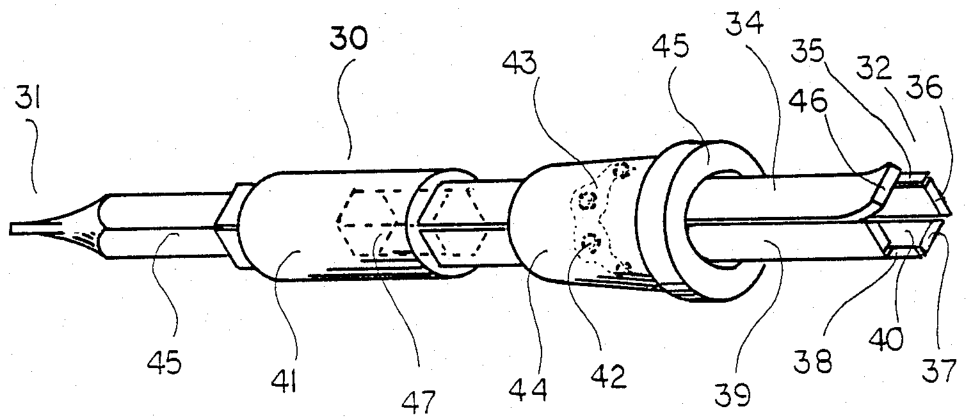

In FIG. 3 is shown rotary driving tool 30 according to the present invention, having distal end 31 and proximal end 32. The adapting means of tool 30 are the six elongated members 34,35,36,37,38 and 39 each having the substantially flat inside surfaces 40. Sleeve 41 holds members 34 to 39 in evenly spaced assembly which forms toward distal end 31 a cavity into which drive tool bits like the slot screw driver bit 45 can be inserted. The compressing means for members 34 to 39 comprise balls 42 which can of course be other rolling means as cylindrical rollers for example. Balls 42 are held in cage 43 which is disposed between members 34 to 39 and sliding member 44 whose interior central hole is greater in diameter toward the proximal end 32. Retaining ring 45 keeps cage 43 inside sliding member 44. Protrusion 46 on member 34 keeps ring 45 from slipping off tool 30. Members 34 to 39 could be cut from a hardenend flat wire dimensioned to fit closely on the shank of a further screw driver bit. Cage 43 and rolling means 42 could be modified components of ball- or roller bearings and tapering member 44 of a suitably hardened metal. Sleeve 41 could hold members 34 to 39 disposed about spacer plug 47 in a press-fit.

In operation a selected tool 45 would be inserted into the cavity formed by the inside surfaces 40 at the distal end 31 and if quick temporary one-hand change-over from one driving mode to another is required, the proximal end 32 can be slid onto the shank portion of a driver bit already in an electric screw driver. By subsequently moving sliding member 44 toward proximal end 32 increasing pressure is brought onto members 34 to 39 by balls 42 as the diameter of the center hole of sliding member 44 decreases at the contact point. After completion of that work-phase movement of member 44 toward distal end 31 will free members 34 to 39 and finally take tool 30 off the driving shank portion.

Alternately the slope in the gap between the center hole of member 44 and members 34 to 39 can be provided by a gradual increase in the thickness of these members or setting them in a bend outwardly from the center of tool 30. While the related dimensions of the elongated members, compressing means and combined shank portions in all embodiments is important it should be noted that these adapting means are self-adjusting and will function even as they continue to wear.

Further structural details of the present invention have been dispensed with as they are discernable to those skilled in the art by the disclosure furnished. Features described in the foregoing embodiments can of course be exchanged and substituted without departing from the spirit of the disclosed invention. For example screw drill 20 could have one member 23, one member 13 as shown on adapting tool 10 and one member 34 as illustrated on driving tool 30. Also, instead of the axially sliding compressing ring 17 on tool 10 a threaded nut-type collar rotating on thread segments on outer surfaces of the elongated members 13 and 14 could be used to provide the concentric pressure to urge members 13 and 14 against shank portion 16. Further, detention notches could be provided on elongated members 34 to 39 to prevent back-sliding of member 44. The present invention should therefore not be construed to be limited to the disclosed embodiments, but should be considered to be defined by the following claims:

I claim:

1. A rotary tool having a distal end adapted to perform a work function and a proximal end adapted to receive rotation from the shank portion of another rotary tool bit by adapting means comprising:

(a) at least two elongated members axially aligned and radially spaced on said rotary tool, said elongated members having substantially smooth outside surfaces and inside surfaces with respect to said rotary tool, said inside surfaces adapted to receive rotational forces from said shank portion, (b) compressing means disposed about said elongated members, and adapted for generating concentric pressure between said elongated members and said shank portion, said compression means comprising a slideable member with a tapering cavity having at a first selected portion of said elongated members a greater clearance than at a second selected portion of said elongated members and (c) friction reducing members disposed within said cavity between said slideable member and said outer surfaces, said friction reducing members for easing the sliding movement of said slideable member and for transferring concentric pressure from said slideable member to said shank portion via said elongated members, so that when said slideable member is moved from said first selected portion toward said second selected portion said concentric pressure is gradually increased.

2. A rotary tool as defined in claim 1 where said friction reducing members are rolling members and are retained in selected positions by retaining means.

3. A rotary tool as defined in claim 1 where said greater clearance is the result of taper of a portion of said cavity.

4. A rotary tool as defined in claim 1 where said greater clearance is the result of taper of said outer surface.

* * * * *